Jan. 7, 1964  J. H. SPENCE  3,116,861
VEHICLE LUGGAGE CARRIER AND MOUNTING ASSEMBLY THEREFOR
Filed March 10, 1961  2 Sheets-Sheet 1

James H. Spence
INVENTOR.

Jan. 7, 1964  J. H. SPENCE  3,116,861
VEHICLE LUGGAGE CARRIER AND MOUNTING ASSEMBLY THEREFOR
Filed March 10, 1961  2 Sheets-Sheet 2
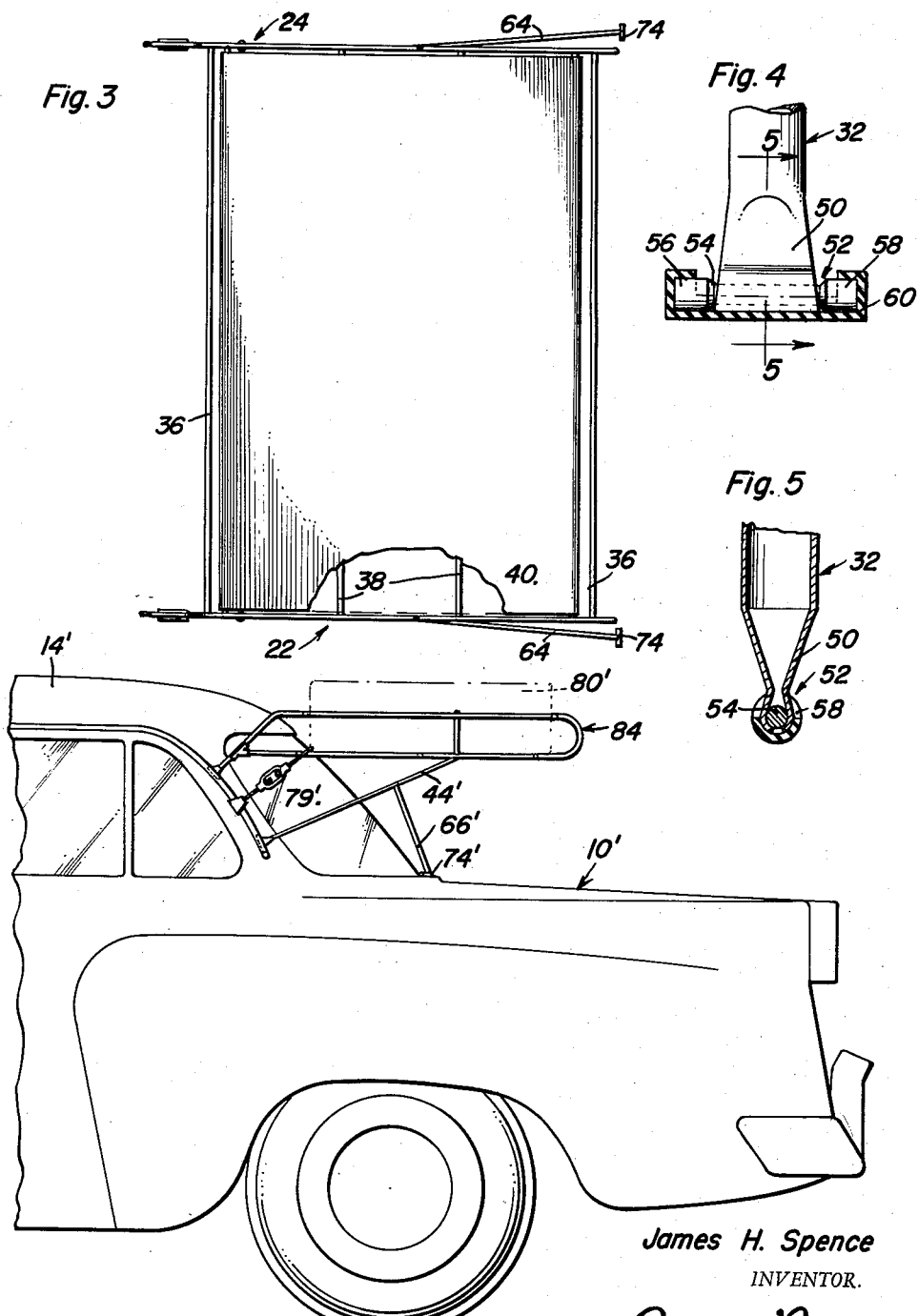
James H. Spence
INVENTOR.

United States Patent Office 3,116,861
Patented Jan. 7, 1964

3,116,861
VEHICLE LUGGAGE CARRIER AND MOUNTING ASSEMBLY THEREFOR
James H. Spence, Gold Hill, Oreg.
(P.O. Box 284, Burlingame, Calif.)
Filed Mar. 10, 1961, Ser. No. 94,915
2 Claims. (Cl. 224—42.1)

This invention relates to a novel and useful vehicle luggage carrier and mounting assembly therefor specifically adapted to be mounted on a motor vehicle in a location whereby the luggage carrier and contents will not cause excessive wind resistance such as is the case when a luggage carrier is mounted above the top of the motor vehicle.

Although the vehicle luggage carrier of the instant invention is designed primarily for use in connection with smaller motor vehicles, it is to be understood that the luggage carrier may be used to an advantage on substantially every type of passenger motor vehicle.

When a luggage carrier is mounted atop a small vehicle falling in the "compact" class, the top speed of the compact vehicle is appreciably reduced because of the additional wind resistance caused by the luggage carrier and its contents. Inasmuch as compact vehicles are not capable of extremely high speeds and highway speed limits may not be readily maintained by some compact vehicles, the addition of a luggage carrier to the top of a compact vehicle in all cases offers sufficient additional wind resistance to appreciably reduce the cruising speed of moderately powered compact vehicles and also appreciably decreases the number of miles a moderately powered compact vehicle may travel on a gallon of fuel. Although larger and more powerful vehicles are also adversely affected by the addition of a luggage carrier to the top of these vehicles, the increase in wind resistance and decrease in fuel economy is not as great in proportion inasmuch as the larger vehicles have considerably more frontal area and thus a much greater resistance to the wind when operating at high speeds. Accordingly, the adverse effects of a luggage carrier on the top of a large vehicle are not as great in proportion as are the adverse effects encountered when a luggage carrier is mounted atop a "compact" vehicle or the like.

Most passenger type vehicles are provided with rear windows and inasmuch as the addition of a luggage carrier to a vehicle at bumper height would increase the overall length of a vehicle it is not desirable to add a luggage carrier which is disposed at bumper height. Inasmuch as most vehicles are provided with trunk compartments which project upwardly to an area immediately below a horizontal plane passing through the lower edges of the rear window of a vehicle, it is also undesirable to mount a vehicle luggage carrier above the trunk compartment thereof as the luggage carrier and contents would constitute an obstruction making it extremely difficult to view the road over which a vehicle is travelling through the rear window of the vehicle. As previously set forth the addition of the vehicle luggage carrier to the top of the vehicle greatly increases the wind resistance of the vehicle while moving at high speeds, and therefore it is a main object of this invention to provide a luggage carrier provided with a mounting assembly specifically adapted to mount the luggage carrier in a location so that the lower surfaces thereof are in substantial horizontal alignment with the top edge of a vehicle rear window. Then, the luggage carrier may be loaded to a vertical height not exceeding the top of the vehicle. In this manner, a luggage carrier may be used while maintaining the total wind resistance of the vehicle at a minimum and affording an unobstructed view through the rear window of the vehicle and in some cases actually improving the view through the rear window of the vehicle.

A further object of this invention, in accordance with the immediately preceding object, is to provide a vehicle luggage carrier and mounting assembly therefor that may be readily constructed in a manner to be tailor fitted to various types of passenger vehicles.

A still further object of this invention is to reduce the over-all loading height of the luggage carrier from that of top mounted type carriers, thus facilitating the placing of luggage, tarpaulins, etc.

A still further object of this invention is to provide a mounting assembly specifically adapted to utilize existing component parts of vehicles for mounting a vehicle luggage carrier thereon. The mounting assembly utilizes the conventional rain gutters which are provided along opposite sides of the top of substantially all types of sedan type vehicles and also utilizes the rear bumper of some of the vehicles to which the luggage carrier is secured.

Still another object of this invention is to provide a mounting assembly for a vehicle luggage carrier capable of mounting the luggage carrier below and to the rear of the top of a vehicle in a manner whereby the opening and closing of the trunk lid, or engine cover in the case of vehicles having their engines mounted in the rear, will not be impaired.

A final object to be specifically enumerated herein is to provide a vehicle luggage carrier and mounting assembly therefor which will conform to conventional forms of manufacture, be of simple construction, and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top plan view of the vehicle luggage carrier;

FIGURE 4 is a fragmentary perspective view of the lower end of one of the depending spacing supporting members carried by the luggage carrier;

FIGURE 5 is a fragmentary vertical sectional view taken substantially upon the plane indicated by section line 5—5 of FIGURE 4; and FIGURE 6 is a fragmentary side elevational view of the rear portion of a different type of motor vehicle shown with a slightly modified form of vehicle luggage carrier mounted thereon.

Figure 1:
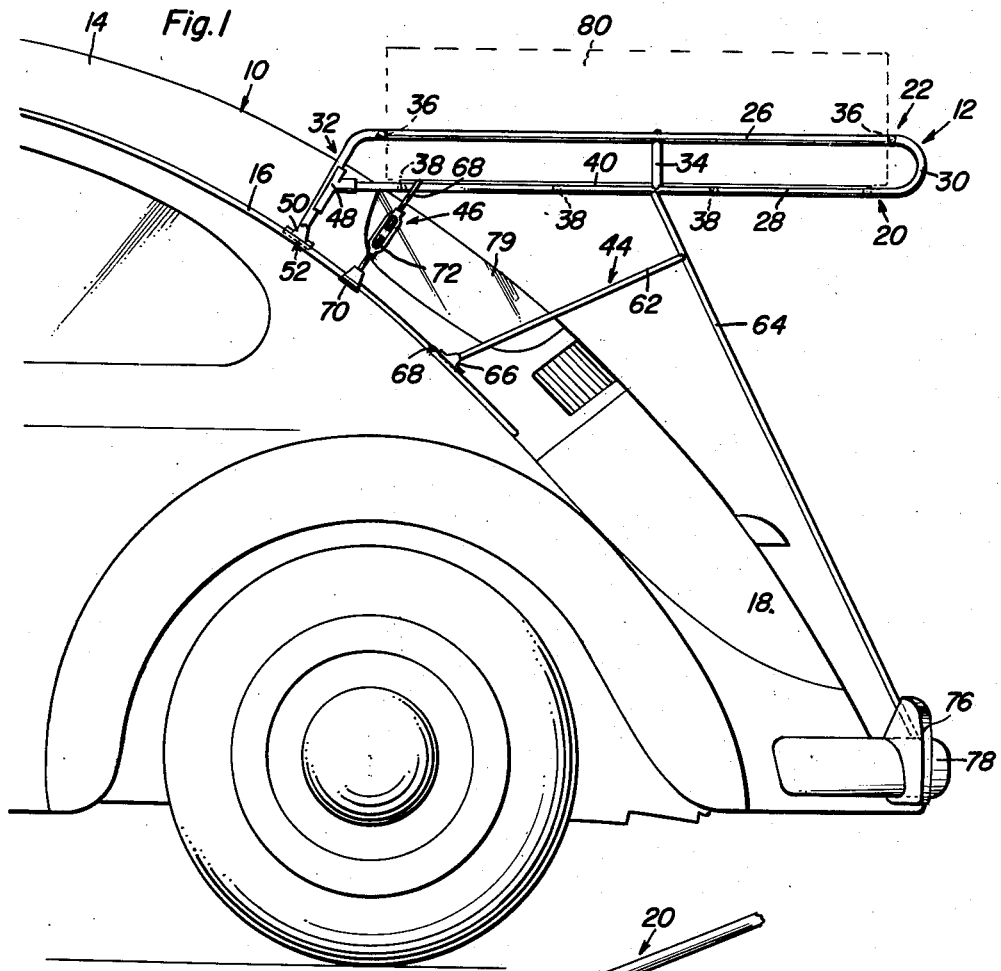
FIGURE 1 is a fragmentary side elevational view of the rear portion of a vehicle shown with the vehicle luggage carrier of the instant invention mounted thereon.

Referring now more specifically to the drawings the numeral 10 generally designates a popular type of small foreign car on which the vehicle luggage carrier 12 of the instant invention is mounted. The vehicle 10 includes a top 14 and opposite side rain gutters 16. Also, the vehicle 10 has its engine positioned in the rear and an engine cover 18 is provided for gaining access to the engine (not shown).

The luggage carrier 12 comprises a generally elongated load platform assembly which is referred to in general by the reference numeral 20. The load platform assembly 20 includes a pair of opposite side frames 22 and 24. Each of the side frames 22 and 24 includes upper and lower side members 26 and 28 which are interconnected at their rear ends by means of bight portion 30 and at their forward ends by means of one of the depending and rigid spacing supporting members which is referred to in general by the reference numeral 32.

A vertical bracing member 34 is secured between each pair of side members 26 and 28 and at least one pair of upper transverse members 36 are secured between the side members 26 while a plurality of transverse members 38 are secured between the side members 28.

Figure 2:
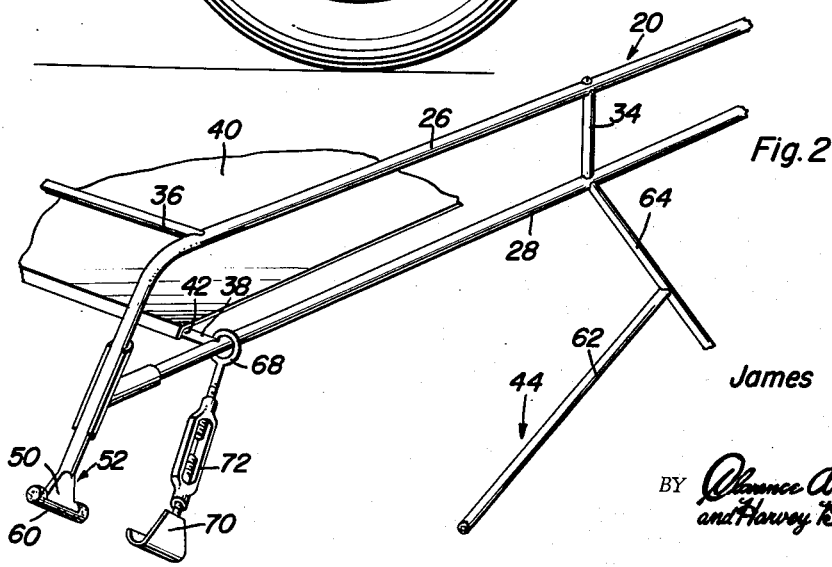
FIGURE 2 is a fragmentary perspective view of the side of the forward portion of the luggage carrier.

A generally horizontal and substantially flat load supporting member 40 is secured over the transverse members 38 in any convenient manner such as by welding 42, see FIGURE 2. The forward end of the load platform assembly 20 includes two of the forward rigid spacing supporting members 32 and two of the rear rigid spacing supporting members generally referred to by the reference numeral 44.

One forward and one rear spacing supporting member is provided on each side of the assembly 20 and disposed between the forward and rear rigid spacing supporting members 32 and 44 on each side of the assembly 20 is a depending tension member generally referred to by the reference numeral 46.

Each of the rigid spacing supporting members 32 comprises a downturned end portion of the forward end of the corresponding side member 26. The adjacent end of the corresponding side member 28 is secured to the midportion spacing support member 32 by means of a mounting bracket 48 in any convenient manner such as by welding. It will be noted that the side members 26 and 28 are formed of one continuous piece of tubing and that the lower end of each of the rigid spacing supporting members 32 is flattened as at 50 and clamped about a transversely extending foot member 52, see FIGURES 4 and 5. Each of the flattened end portions 50 may also be secured to the corresponding foot member by welding if desired and will be noted that each of the foot members 52 includes a generally rod-like member 54 having diametrically enlarged opposite end portions 56 and 58. A resilient covering or shoe 60 is disposed about and encloses the opposite end portions 56 and 58 and the lower surfaces of each of the foot members 52. The rear rigid spacing and supporting members 44 each include an elongated tubular section 62 which has one end secured to the corresponding side member 28 by means of a depending rear support standard 64. Each of the lower ends of the rear rigid spacing supporting members 44 includes a flattened end portion 66 similar to the flattened end portion 50 and a corresponding foot member 68.

Disposed between the spacing supporting members 32 and 44 on each side of the assembly 20 is the corresponding tension member 46 which includes a turnbuckle assembly having an eye member 68 on its upper end slidably engaged with the corresponding side member 28 and a hooked end member 70 on its lower end. The center portion 72 of each of the tension members 46 may of course be rotated to adjust the overall length of the tension member.

From FIGURE 3 of the drawings it will be noted that the lower end of each of the rear support standards 64 is provided with a transversely extending foot member 74 which is adapted to be engaged in the pocket formed by the bumper guard 76 of the rear bumper 78 of the vehicle.

In operation, the foot members 52 and 68 are laterally received within and abuttingly engage the corresponding rain gutters 16 to support the assembly 20 on the vehicle 10 and each of the tension members 46 has its hooked end member 70 disposed in embracing relation with a portion of the corresponding rain gutter 16 disposed between the corresponding foot members 52 and 68. The turnbuckle may then be adjusted to apply the proper tension on the tension member 46 to prevent fulcruming of the assembly about the lower end of member 44. It will be noted that the foot member 74 of each of the support standards 64 is also engaged with the corresponding bumper guard 76. In this manner, the rigid spacing supporting members 32 and 44 together with the tension members 46 support the assembly 20 on the vehicle 10. The support standards 64 are not required for actual vertical support of the assembly 20 but for additional bracing to prevent lateral displacement of the assembly relative to the vehicle.

It will be noted from FIGURE 1 of the drawings that the flat load supporting member 40 is disposed adjacent the intersection of the rear window and the top and in substantial horizontal alignment with the upper edges of the rear window 79 of the vehicle 10 and that the load 80 positioned on the assembly 20 terminates at its upper end in substantially horizontal alignment with the uppermost portion of the top 14 of the vehicle 10. In this manner, the load 80 and the assembly 20 is positioned behind a portion of the vehicle 10 in such a manner whereby the rear window 79 is not obstructed and the overall length of the vehicle 10 is not increased and without positioning any portion of the vehicle 20 or the load 80 supported thereby above the uppermost surface of the top 14 of the vehicle 10.

It will be noted that the load supporting member 40 also provides a sun shield for the rear window 79 since it is placed directly over the window and between horizontal planes passing through the top of the roof and the upper portion of the rear window thereby further increasing the visibility through the latter inasmuch as any dust particles on the window 79 will not reflect direct sunlight and impair vision through the window 79.

With attention now directed to FIGURE 6 of the drawings there will be seen a modified form of assembly generally referred to by the reference numeral 84. The luggage carrier assembly 84 is substantially identical to the luggage carrier assembly 20 with the exception being that the rear rigid spacing supporting member 44' is connected at its upper end directly to the assembly 84. Each of the rear support standards 66' instead of being secured to the assembly 84 at their upper ends are secured to a midportion of the rear rigid spacing supporting member 44'. The luggage carrier assembly 84 is secured to the vehicle 10' in substantially the same manner as the assembly 20 is secured to the vehicle 10 with the exception being that the foot member 74' is in the form of a mounting plate adapted to engage the upper surfaces of the vehicle body 10' immediately rearward of the window 79'.

It will be noted therefore that the luggage carrier assembly 84 accomplishes the same function as the assembly 20 by providing a means by which a load 80' may be supported to the rear of and above the rear window of a vehicle in a manner whereby the load 80' does not project an appreciable amount above the uppermost portion of the top 14' of the vehicle 10' and does not obstruct the view through the rear window 79'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle having a roof and an inclined rear window at the rear thereof, load supporting means disposed at the rear of the vehicle generally below the top surface of the roof and directly above the window to reduce the wind resistance of the load supporting means and the load carried thereon during forward movement of the vehicle, said load supporting means including a platform forming a shield for the rear window, longitudinally spaced depending forward and rear supporting members attached thereto at each side for supporting the platform in substantially a horizontal position, the lower ends of said supporting members having means thereon abuttingly engaging the vehicle, and tension means interconnecting the load supporting means and the vehicle intermediate the forward and rear supporting members retaining the forward and rear supporting members in compression thereby locking the load supporting means to the vehicle and preventing fulcruming movement of the load supporting members about the lower end thereof.

2. The combination as defined in claim 1 wherein said tension means includes a turnbuckle attached to the load supporting means and disposed in generally parallel relation to the forward supporting member, said means on the lower end of each supporting member includes a foot member, said vehicle including rain gutters extending down along opposite sides of said rear window, said foot members abuttingly engaging said rain gutters.

References Cited in the file of this patent
UNITED STATES PATENTS

| | | |
|---|---|---|
| 2,357,203 | Jimmes | Aug. 29, 1944 |
| 2,589,772 | Carter et al. | Mar. 18, 1952 |

FOREIGN PATENTS

| | | |
|---|---|---|
| 976,846 | France | Nov. 1, 1950 |
| 1,079,548 | France | May 19, 1954 |